United States Patent
Nakashima et al.

(10) Patent No.: US 12,057,687 B2
(45) Date of Patent: Aug. 6, 2024

(54) ELECTRICAL JUNCTION BOX

(71) Applicant: YAZAKI CORPORATION, Tokyo (JP)

(72) Inventors: Akinori Nakashima, Makinohara (JP); Hiroki Goto, Makinohara (JP); Takao Nogaki, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 182 days.

(21) Appl. No.: 17/893,807

(22) Filed: Aug. 23, 2022

(65) Prior Publication Data
US 2023/0066985 A1 Mar. 2, 2023

(30) Foreign Application Priority Data

Aug. 30, 2021 (JP) .................... 2021-140353

(51) Int. Cl.
*H02G 3/08* (2006.01)
*H02G 3/16* (2006.01)

(52) U.S. Cl.
CPC .............. *H02G 3/081* (2013.01); *H02G 3/16* (2013.01)

(58) Field of Classification Search
CPC ............ H02G 3/08; H02G 3/081; H02G 3/16; H02G 3/10; H02G 3/14; H02G 3/088; H05K 5/00; H05K 5/02; H05K 7/06; B60R 16/00; B60R 16/02; B60R 16/0238; H01R 13/684; H01R 13/46
USPC ..................... 174/50, 520, 66, 67, 542, 535; 220/3.2–3.9, 4.02; 439/76.1, 76.2, 949; 312/223.1, 223.6; 361/600, 601, 622, 641
See application file for complete search history.

(56) References Cited

U.S. PATENT DOCUMENTS

| | | | | |
|---|---|---|---|---|
| 6,462,270 B1* | 10/2002 | Depp | ..................... | H02G 3/081 174/59 |
| 7,699,623 B2* | 4/2010 | Yoshida | ................. | H02G 3/081 439/949 |
| 8,488,303 B2* | 7/2013 | De La Reza | ....... | B60R 16/0238 361/641 |
| 8,804,314 B2* | 8/2014 | Kamo | ................. | B60R 16/0238 361/641 |
| 8,835,760 B2* | 9/2014 | Saimoto | ............... | H01R 13/514 174/559 |
| 10,879,683 B1* | 12/2020 | Kanemitsu | .......... | B60R 16/0238 |
| 11,205,889 B2* | 12/2021 | Kurata | .................... | H02G 3/081 |
| 11,588,313 B2* | 2/2023 | Tomita | ................ | B60R 16/0238 |
| 2011/0299229 A1 | 12/2011 | De La Reza et al. | | |

(Continued)

FOREIGN PATENT DOCUMENTS

| | | |
|---|---|---|
| JP | 2003-125516 A | 4/2003 |
| JP | 2014-193073 A | 10/2014 |
| JP | 2015-231309 A | 12/2015 |

*Primary Examiner* — Angel R Estrada
(74) *Attorney, Agent, or Firm* — Sughrue Mion, PLLC

(57) ABSTRACT

An electrical junction box includes a case body having a plurality of connector portions, a power supply side circuit board accommodated in the case body and a general-purpose connector mounting unit provided in the case body and configured such that a plurality of types of connectors are selectively attached to and detached from the general-purpose connector mounting unit. The general-purpose connector mourning unit is configured such that a power supply side terminal of the plurality of types of connectors is electrically connected to a terminal connection portion of the power supply side circuit board.

3 Claims, 10 Drawing Sheets

(56) References Cited

U.S. PATENT DOCUMENTS

2014/0291013 A1    10/2014   Higuchi et al.
2017/0063053 A1     3/2017   Muto et al.

\* cited by examiner

ELECTRICAL JUNCTION BOX

CROSS-REFERENCE TO RELATED APPLICATION

The present application claims priority to Japanese Patent Application No. 2021-140353 filed on Aug. 30, 2021, the entire content of which is incorporated herein by reference.

TECHNICAL FIELD

The present invention relates to an electrical junction box.

BACKGROUND

A related art electrical junction box is capable of flexibly dealing with a difference in vehicle type or grade and further reducing man-hours for development and manufacturing cost (see, for example, JP2014-193073A). In an electrical junction box including an electric circuit connected to a load provided on a vehicle body, the electrical junction box includes a plurality of types of optional units each including an additional circuit selectively used according to a vehicle type or grade with respect to a base unit including a common circuit commonly used for a plurality of vehicle types or grades. When the optional unit is selectively combined with the base unit, an electric circuit is formed by the common circuit of the base unit and the additional circuit of the selected optional unit. The base unit and the selected optional unit are attached to a case made of a synthetic resin prepared for each vehicle type or grade and are fixed to the vehicle body.

In addition, an electrical junction box that can be used across vehicle types has been proposed (see, for example, JP2015-231309A). The electrical junction box includes an electrical junction box casing (case body), a common relay block, an individual corresponding relay block, a common power supply block, and an individual corresponding semiconductor module. The individual corresponding semiconductor module and one or more blocks of the common relay block, the individual corresponding relay block, and the common power supply block are accommodated in an accommodating chamber of the electrical junction box casing, and the not accommodated blocks are accommodated in an accommodating chamber formed in the accommodated blocks.

However, in the electrical junction box in the related art, different connectors (fusible links, fuses, and the like) cannot be replaced and mounted on the same mounting portion (fusible link mounting portion, fuse mounting portion, and the like), and therefore, it is difficult to change a circuit.

SUMMARY

Illustrative aspects of the presently disclosed subject matter provide an electrical junction box in which a circuit can be easily changed by making it possible to replace different connectors.

According to an illustrative aspect of the presently disclosed subject matter, an electrical junction box includes a case body having a plurality of connector portions, a power supply side circuit board accommodated in the case body and a general-purpose connector mounting unit provided in the case body and configured such that a plurality of types of connectors are selectively attached to and detached from the general-purpose connector mounting unit. The general-purpose connector mounting unit is configured such that a power supply side terminal of the plurality of types of connectors is electrically connected to a terminal connection portion of the power supply side circuit board.

Other aspects and advantages of the presently disclosed subject matter will be apparent from the following description, the drawings and the claims.

DESCRIPTION OF EMBODIMENTS

Figure 1:
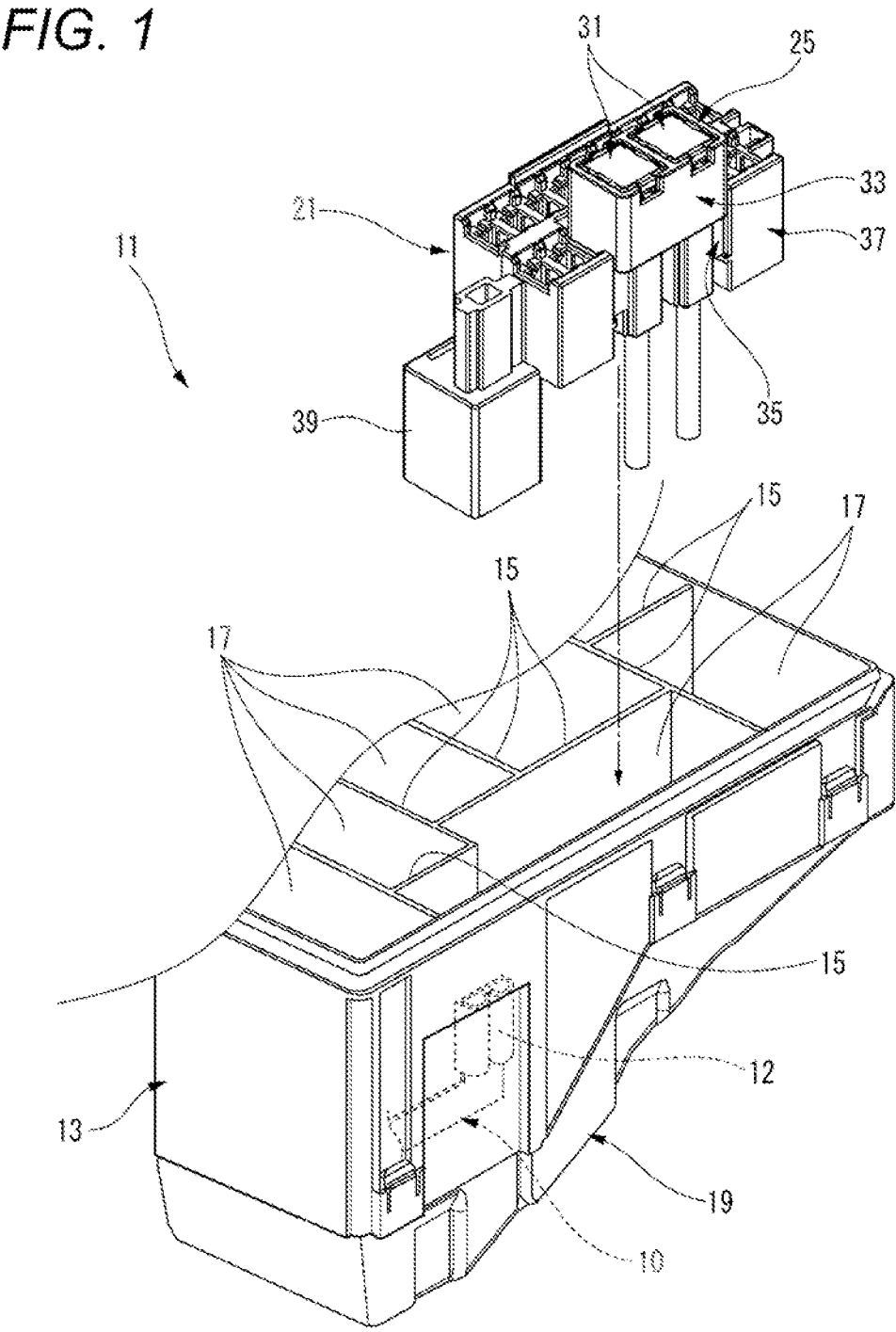
FIG. 1 is an exploded perspective view of main parts of an electrical junction box according to an embodiment of the present invention.

Hereinafter, an embodiment according to the present invention will be described with reference to the drawings. FIG. 1 is an exploded perspective view of main parts of an electrical junction box 11 according to an embodiment of the present invention. For example, a "fuse block" in which a large number of fuses can be inserted and removed is used for a power transmission line of a vehicle in order to protect electric circuits of various electronic devices. Since the fuse block may have a relay and the like, the fuse block is also called a "relay box" or a "junction block". In the present specification, the fuse block, the relay box, and the junction block are collectively referred to as an electrical junction box 11.

The electrical junction box 11 according to the present embodiment includes a case body 13 forming an outer shell, a busbar 10 as a power supply side circuit board provided integrally with the case body 13, a lower cover 19 covering a lower opening of the case body 13, and an upper cover (not shown) covering an upper opening of the case body 13. A plurality of connector portions to which electric components such as a relay, a fuse, a fusible link, and a harness connection socket are mounted are provided on, for example, an upper face of the case body 13. In the present embodiment, the connector portion is a mounting portion 17 which is a box-shaped recessed portion opening on the upper face of the case body 13 by partitioning the case body 13 by a plurality of partition walls IS. Each of the mounting portions 17 is provided with a terminal portion (not shown) formed by bending or cutting a plate-shaped busbar. The terminal portion disposed in the mounting portion 17 is electrically connected to a power supply side terminal such as a relay (not shown), a fuse, a fusible link, or a harness connection socket mounted on the mounting portion 17. The upper cover covers the electric components mounted on an upper portion of the case body 13, and the lower cover 19 derives an electric wire from a lower portion of the case body 13.

The electrical junction box 11 according to the present embodiment includes a general-purpose connector mounting unit 21 that is provided in a part of the case body 13 and allows a plurality of types of connectors to be selectively attached and detached. In the general-purpose connector mounting unit 21, a power supply side connection terminal 61, a power supply side terminal 23, or a rescue terminal 107 (see FIGS. 4, 7, and 10), which are power supply side terminals of the plurality of types of connectors, can be electrically connected to a tuning fork terminal 57, which is a part of the terminal connection portions of the busbar 10.

Figure 6:
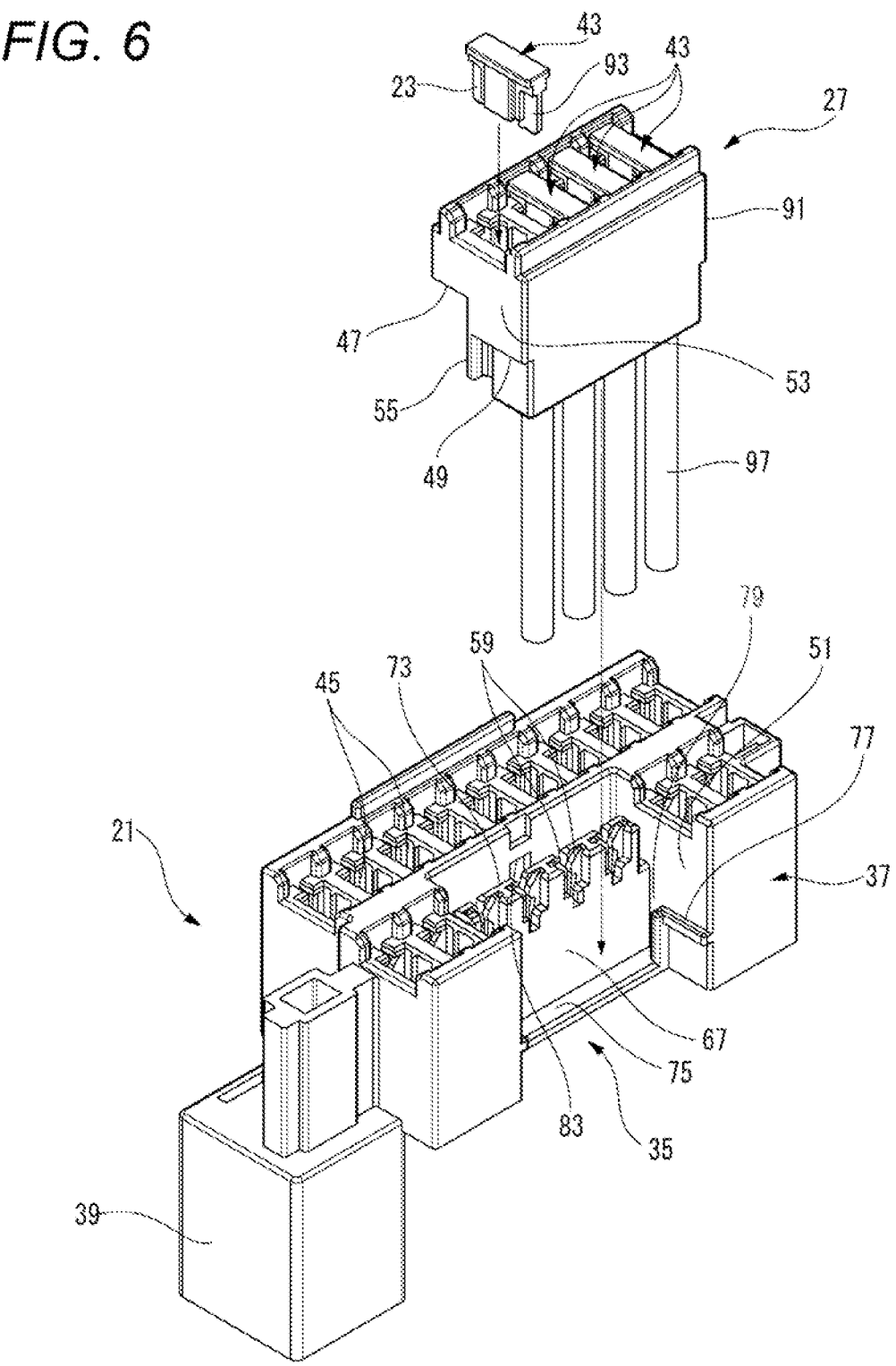
FIG. 6 is an exploded perspective view showing a fuse portion and the general-purpose connector mounting unit.
Figure 8:
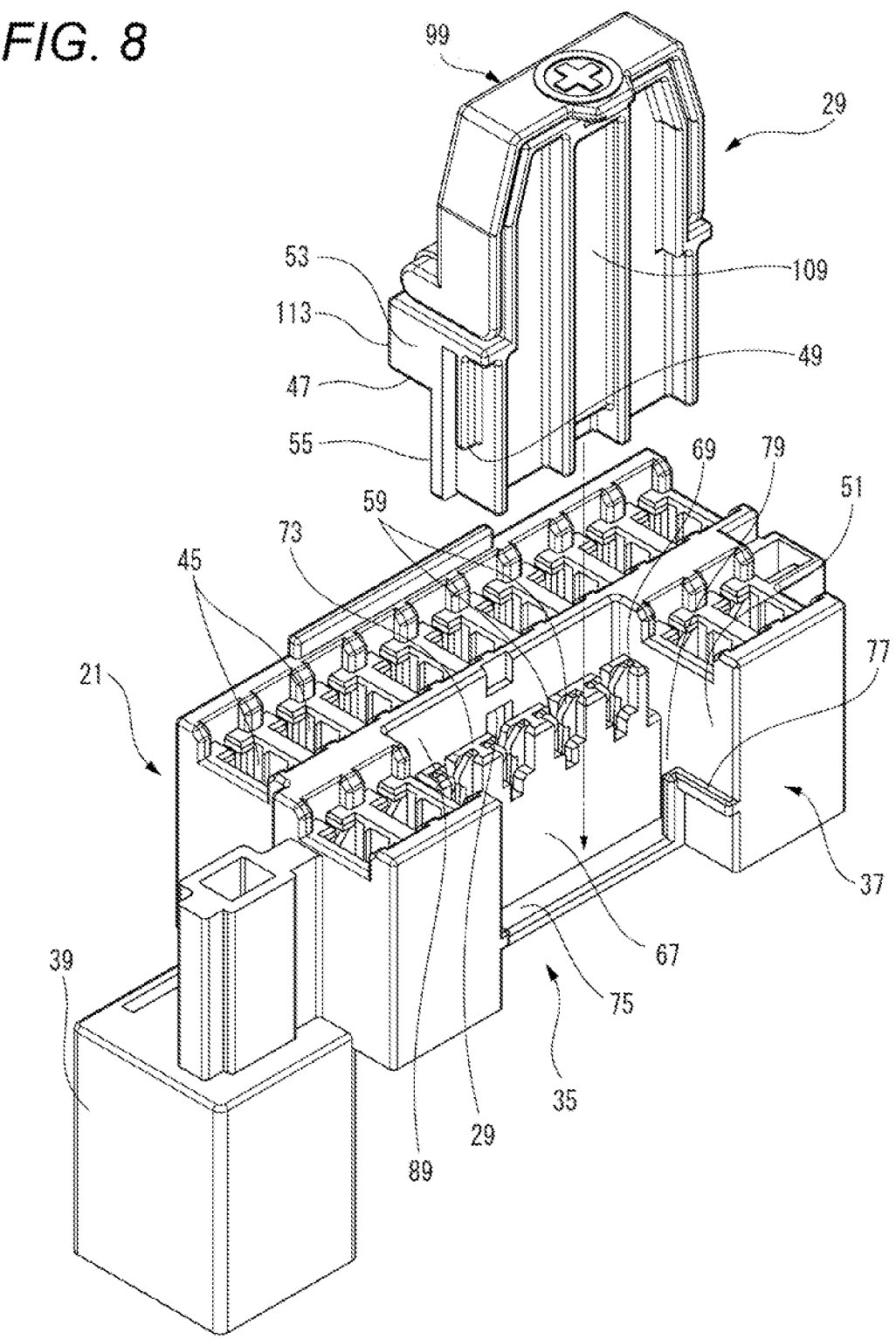
FIG. 8 is an exploded perspective view showing a rescue terminal portion and the general-purpose connector mounting unit.

The connectors in the present embodiment are, for example, a fusible link unit 25 shown in FIG. 1, a fuse portion 27 shown in FIG. 6, and a rescue terminal portion 29 shown in FIG. 8. The fusible link unit 25 shown in FIG. 1 includes two fusible links 31 and a fusible link socket 33 to which the fusible links 31 are mounted. The fusible link unit 25 is mounted on a connector mounting portion 35 of the general-purpose connector mounting unit 21.

Figure 2:
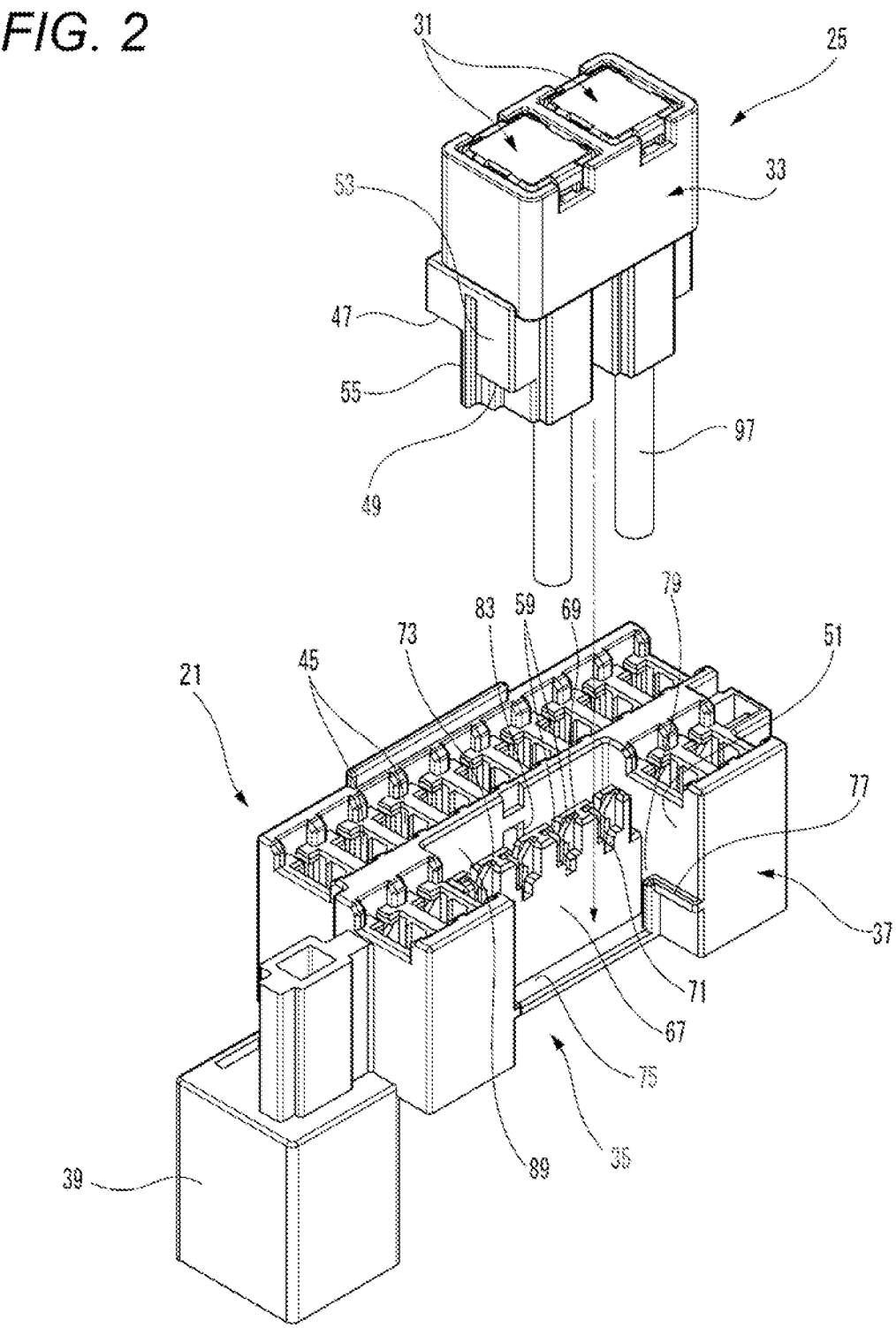
FIG. 2 is an exploded perspective view of a fusible link unit and a general-purpose connector mounting unit.

FIG. 2 is an exploded perspective view of the fusible link unit 25 and the general-purpose connector mounting unit 21. In the general-purpose connector mounting unit 21, a housing body 37 formed of an insulating resin is formed in a rectangular shape in a plan view. A busbar connection housing portion 39 having a substantially square shape in a plan view is integrally formed at one end of the housing body 37 in a longitudinal direction. The busbar connection housing portion 39 accommodates a busbar connection portion 41 (see FIG. 3) connected to a terminal coupling portion 12 of the busbar 10 accommodated in the case body 13. In addition to the connector mounting portion 35, the housing body 37 is provided with, for example, a plurality of fuse mounting portions 45 for mounting a fuse 43 (see FIG. 6) and the like.

The fusible link socket 33 is formed with an upper step portion 47 and a lower step portion 49 which are brought into contact with and positioned in the housing body 37 when the fusible link socket 33 is mounted on the connector mounting portion 35. The lower step portion 49 is formed to hang down (lower side in FIG. 2) from the upper step portion 47. In the fusible link socket 33, an engagement rib 55 extending in an upper-lower direction is provided in a protruding manner on a side face 53 facing an inner wall surface 51 of the connector mounting portion 35.

Figure 3:
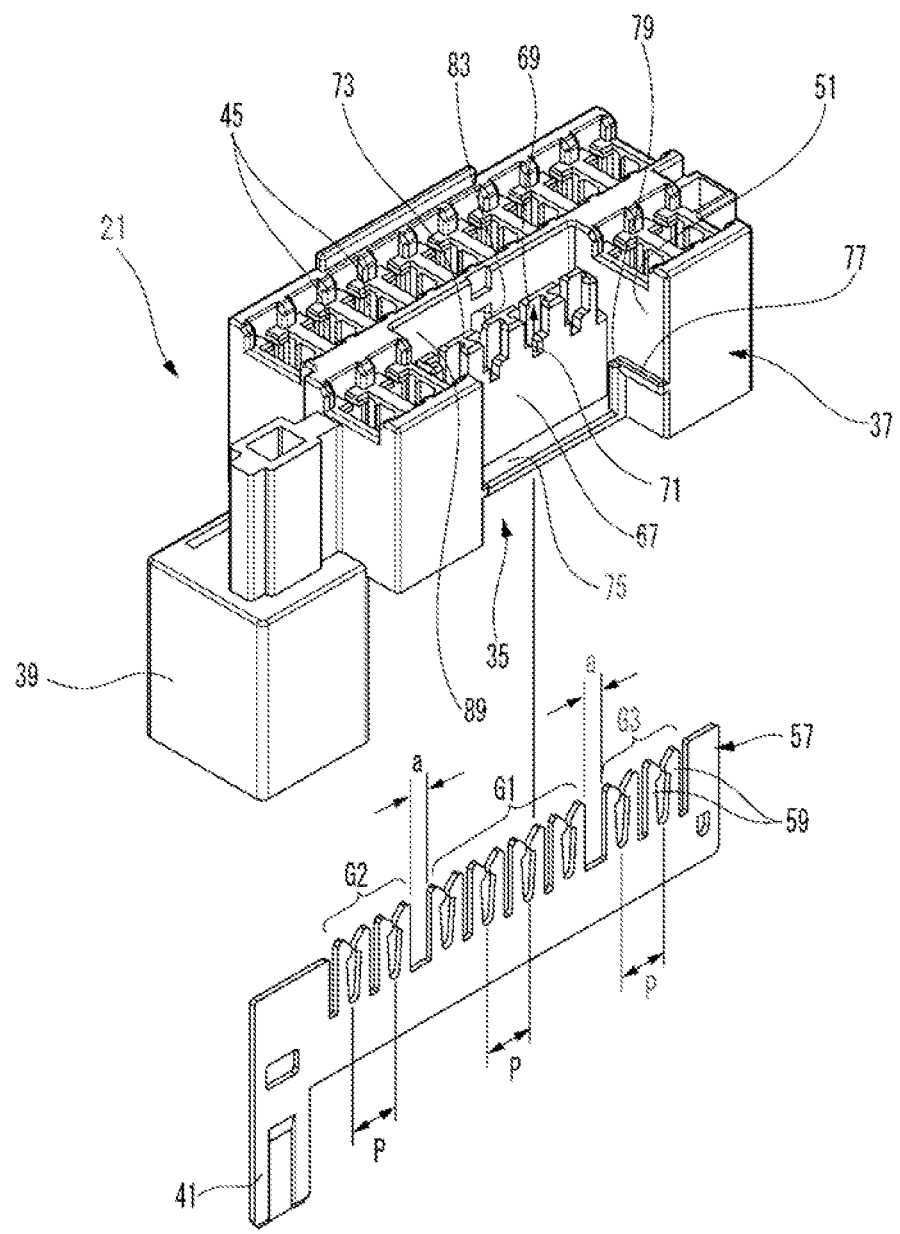
FIG. 3 is an exploded perspective view of the general-purpose connector mounting unit.

FIG. 3 is an exploded perspective view of the general-purpose connector mounting unit 21. In the electrical junction box 11, a terminal connection portion in a part of the busbar 10 is formed as a tuning fork terminal 57. That is, the general-purpose connector mounting unit 21 mounted on the case body 13 accommodating the busbar 10 accommodates the tuning fork terminal 57 connected to the terminal coupling portion 12 of the busbar 10 via the busbar connection portion 41.

In the tuning fork terminal 57, a plurality of pairs (eight pairs in the present embodiment) of holding pieces 59 standing in a tuning fork shape are formed along the longitudinal direction of the housing body 37. The tuning fork terminal 57 comes into contact with the power supply side connection terminal 61, the power supply side terminal 23, or the rescue terminal 107 (see FIGS. 4, 7, and 10) which is the power supply side terminal of a connector inserted between a pair of holding pieces 59.

In the present embodiment, the eight pairs of holding pieces 59 have a group G1 including four pairs of holding pieces 59 arranged at evenly spaced pitches P. The group G1 including the four pairs of holding pieces 59 is sandwiched between a group G2 including two pairs of holding pieces 59 arranged at evenly spaced pitches P, and a group G3 including another pair of holding pieces 59 arranged at evenly spaced pitches P. A separation distance a between the group G1 and the group G2 and a separation distance a between the group G1 and the group G3 are set to be smaller than the pitch P (P>a). As a result, the connector mounting portion 35 is configured to be able to simultaneously connect a plurality of types of power supply side terminals 23 that are spaced apart from each other at a space different from an integral multiple of the pitch P.

Figure 4:
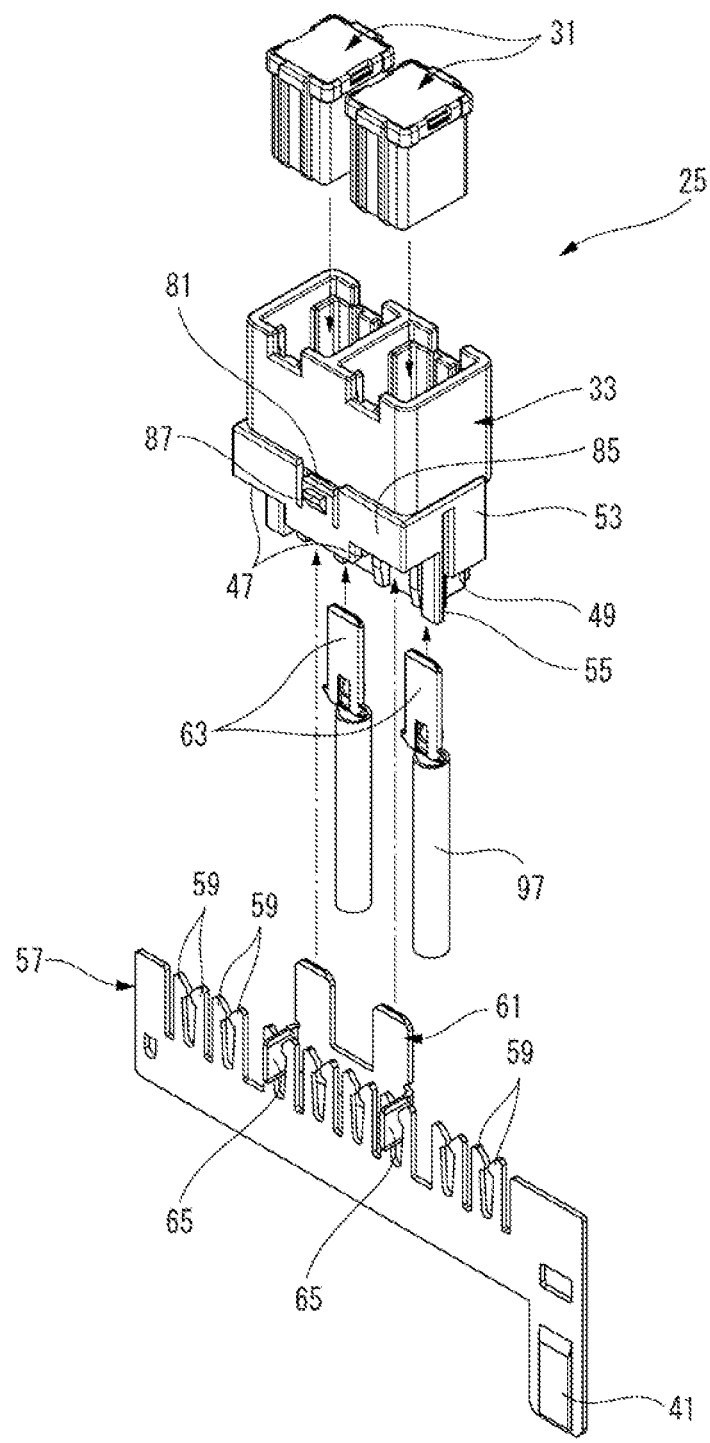
FIG. 4 is an exploded perspective view showing a fusible link, a fusible link socket, and a power supply side terminal.

FIG. 4 is an exploded perspective view showing the 31, the fusible link socket 33, and the power supply side connection terminal 61. The power supply side connection terminal 61, which is the power supply side terminal of the fusible link unit 25, is mounted on the fusible link socket 33. The power supply side connection terminal 61 is electrically connected to a power supply side terminal (not shown) of each of the two fusible links 31 mounted on the fusible link socket 33. The power supply side connection terminal 61 includes electric contact pieces 65 which are a pair of tab terminals. Each of the pair of electric contact pieces 65 is inserted between a pair of different holding pieces 59 of the tuning fork terminal 57 to be conducted. A pair of load side connection tab terminals 63 are mounted on the fusible link socket 33. Each of the pair of load side connection tab terminals 63 is electrically connected to a load side terminal (not shown) of each of the pair of fusible links 31.

Figure 5:
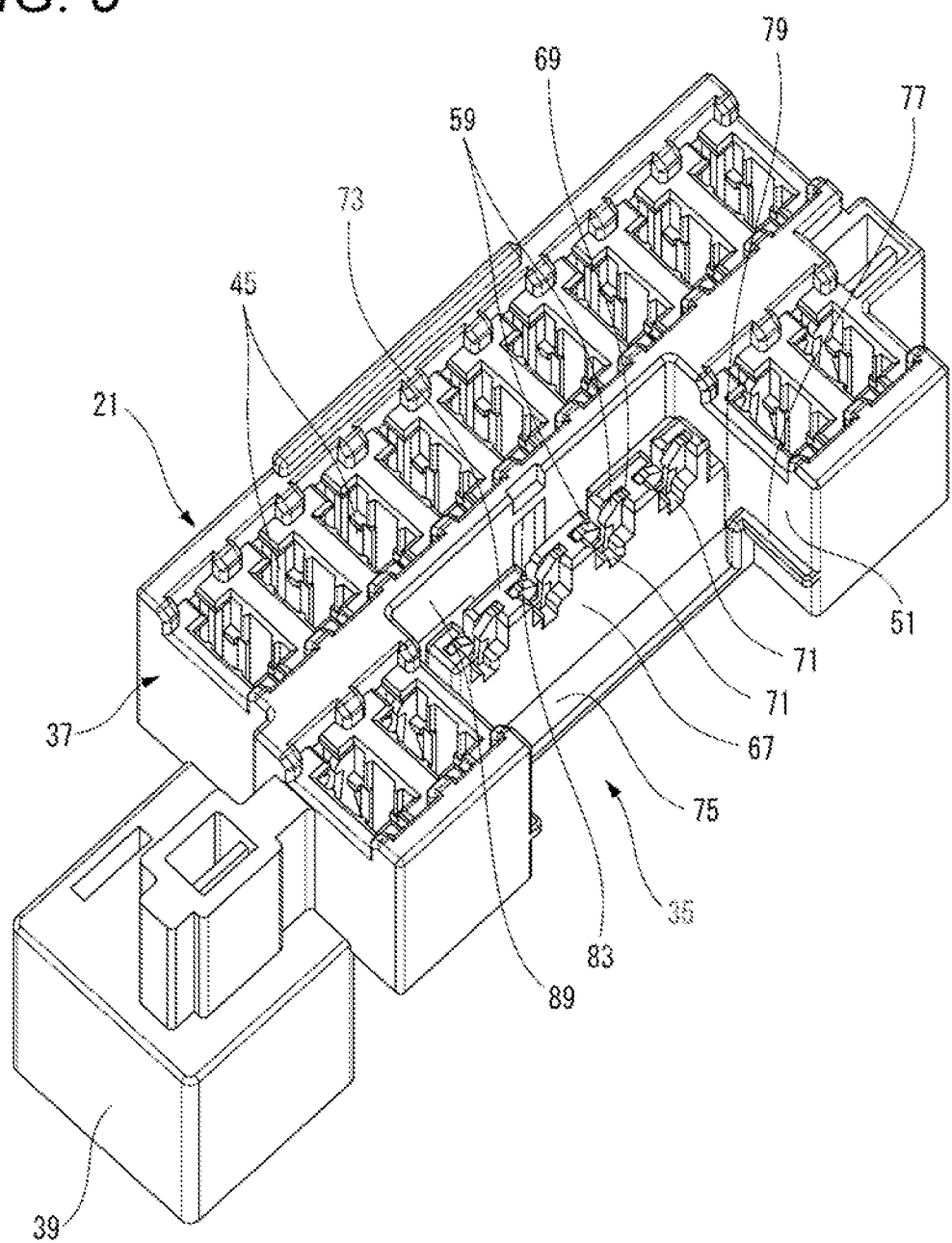
FIG. 5 is a perspective view of the general-purpose connector mounting unit having a deformation prevention protection structure in a connector mounting portion.

FIG. 5 is a perspective view of the general-purpose connector mounting unit 21 having a deformation prevention protection structure in the connector mounting portion 35. The general-purpose connector mounting unit 21 has a deformation prevention protection structure in the connector mounting portion 35. The deformation prevention protection structure includes a peripheral wall portion 67 surrounding the exposed tuning fork terminal 57 in the connector mounting portion 35. The peripheral wall portion 67 prevents deformation of the tuning fork terminal 57 due to external force. The peripheral wall portion 67 has an upper opening portion 69 through which a pair of holding pieces 59 is exposed provided for each pair of holding pieces 59. Further, in the peripheral wall portion 67, a slit 71 into which the electric contact piece 65 of the power supply side connection terminal 61, which is a power supply side terminal of a connector, can be inserted is formed between a pair of holding pieces 59 by being cut downward from the upper opening portion 69.

In the peripheral wall portion 67, a peripheral edge of the upper opening portion 69 serves as an opening upper end surface 73. The opening upper end surface 73 faces the upper step portion 47. In a hem portion of the peripheral wall portion 67, a seating portion 75 parallel to the opening upper end surface 73 is formed to extend from the peripheral wall portion 67. A lower end of the engagement rib 55 comes in contact with or in proximity to the seating portion 75. A placing rib 77 having a placing surface parallel to the opening upper end surface 73 is provided in a protruding manner on the inner wall surface 51 of the connector mounting portion 35. The lower step portion 49 is placed on the placing rib 77. The placing rib 77 extends toward the peripheral wall portion 67, and is connected to the seating portion 75 in an L shape by hanging down with a gap with respect to the peripheral wall portion 67. The gap between the peripheral wall portion 67 and the hanging placing rib 77 serves as an engagement groove 79. The engagement rib 55 is inserted into the engagement groove 79 from above. As a result, at least the lower step portion 49 of the fusible link unit 25 mounted on the connector mounting portion 35 of the general-purpose connector mounting unit 21 is placed on the placing rib 77. In addition, when the engagement rib 55 is fitted into the engagement groove 79, the fusible link unit 25 is restricted from moving in a front-rear direction (a direction parallel to the inner wall surface 51 and perpendicular to the peripheral wall portion 67), a left-right direction (the longitudinal direction of the connector mounting portion 35), and a downward direction (a mounting direction of the fusible link socket 33 with respect to the connector mounting portion 35).

A plurality of types of connectors (the fusible link unit 25, the fuse portion 27, and the rescue terminal portion 29) are selectively locked and fixed to the general-purpose connector mounting unit 21 via a locking mechanism that can be released from above the case body 13. The locking mechanism includes a lock arm 81 shown in FIG. 4 and an engagement recessed portion 83 shown in FIG. 5.

The lock arm 81 is formed on a back wall surface 85 of the fusible link socket 33. The lock arm 81 is disposed parallel to the back wall surface 85 by inserting a pair of parallel cuts into the back wall surface 85 of the fusible link socket 33, and is flush with the back wall surface 85. The lock arm 81 has a cantilever shape in which a base end on a lower side in the mounting direction of the fusible link socket 33 is connected to the back wall surface 85, and a tip end on an upper side in the mounting direction on the opposite side is a free end portion. The free end portion of the lock arm 81 is formed by a lock claw 87 protruding on a surface flush with the back wall surface 85. That is, the lock claw 87 protrudes from the back wall surface 85 of the fusible link socket 33. When the lock claw 87 is pushed, the free end portion of the lock arm 81 is elastically deformed and pushed to a position where the lock claw 87 is flush with the back wall surface 85. That is, in a normal state, the lock claw 87 protrudes from the back wall surface 85.

When the fusible link socket 33 is mounted on the connector mounting portion 35, the lock claw 87 is pressed and pushed into an inner side face 89 of the connector mounting portion 35. When the fusible link socket 33 is inserted (mounted) to a predetermined position, the lock claw 87 of the lock arm 81 displaced to an original position by an elastic restoring force is locked to the engagement recessed portion 83 formed in the inner side face 89 of the connector mounting portion 35. Accordingly, the fusible link socket 33 (that is, the fusible link unit 25) is restricted from being detached from the connector mounting portion 35. On the other hand, when the lock claw 87 is moved to a position flush with the back wall surface 85 by using a jig or the like, the lock arm 81 is unlocked from the engagement recessed portion 83, and the fusible link unit 25 can be detached from the connector mounting portion 35.

FIG. 6 is an exploded perspective view showing the fuse portion 27 and the general-purpose connector mounting unit 21. As shown in FIG. 6, the connector of the electrical junction box 11 may be the fuse portion 27. The fuse portion 27 includes four fuses 43 and a fuse socket 91 for mounting the fuses 43. The fuse portion 27 is mounted on the connector mounting portion 35 of the general-purpose connector mounting unit 21. The fuse 43 includes the power supply side terminal 23 as a power supply side terminal of the fuse portion 27, and a load side terminal 93. Similarly to the fusible link socket 33, the fuse socket 91 has the upper step portion 47, the lower step portion 49, and the engagement rib 55 on the side face 53.

Figure 7:
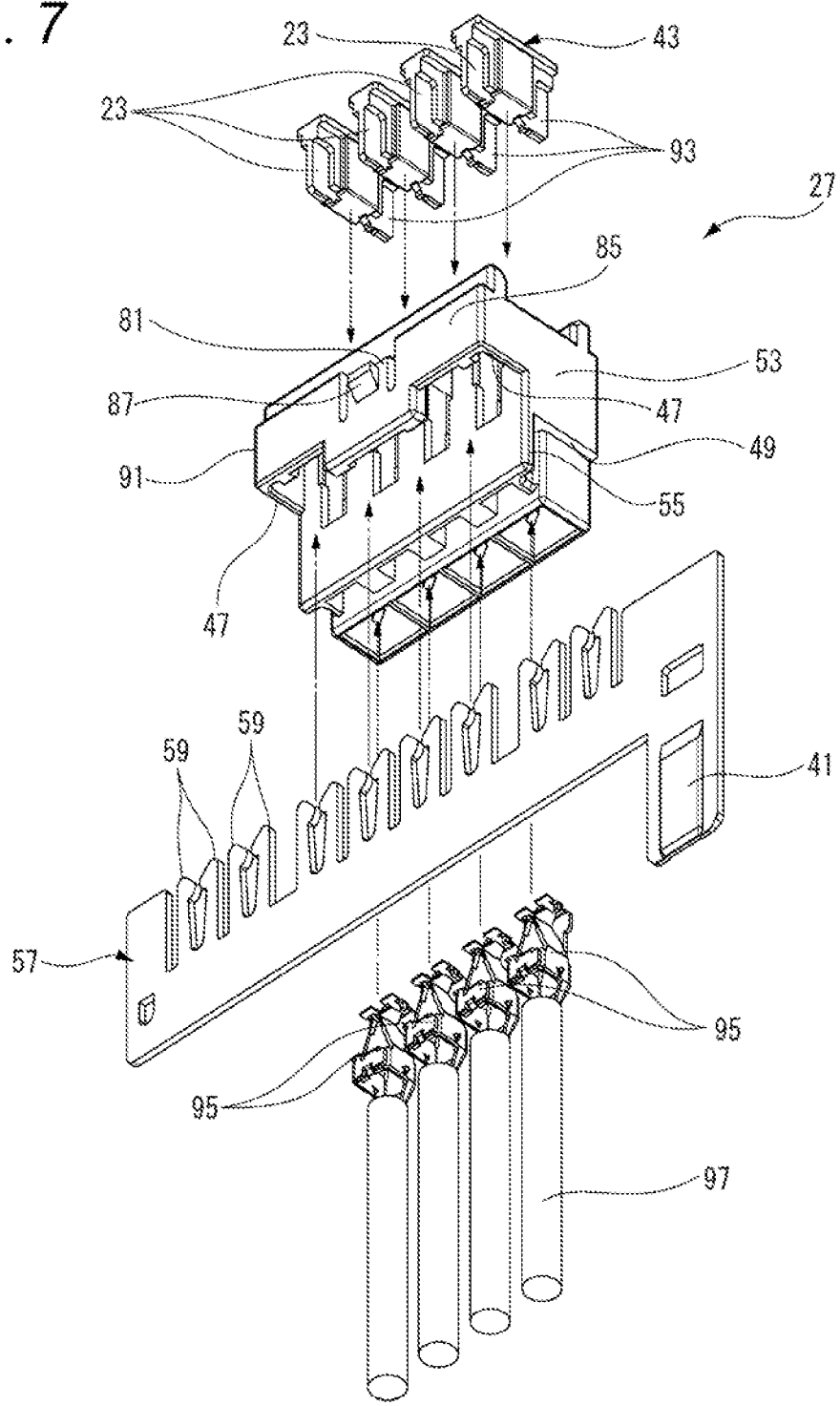
FIG. 7 is an exploded perspective view showing a fuse, a fuse socket, and a tuning fork terminal.

FIG. 7 is an exploded perspective view showing the fuses 43, the fuse socket 91, and the tuning fork terminal 57. In each fuse 43 mounted on the fuse socket 91, the power supply side terminal 23 is brought into direct contact with the holding pieces 59 of the tuning fork terminal 57 accommodated in the housing body 37. Further, a load side connection terminal 95 attached to an end of an electric wire 97 is inserted into the fuse socket 91. The load side connection terminal 95 inserted into the fuse socket 91 is directly connected to the load side terminal 93 of the fuse 43 in the fuse socket 91.

In the case of the fuse portion 27, similarly to the fusible link unit 25, the upper step portion 47, the lower step portion 49, and the engagement rib 55 are also engaged with the opening upper end surface 73, the placing rib 77, and the engagement groove 79 of the connector mounting portion 35. In addition, the fuse portion 27 is restricted from being detached from the general-purpose connector mounting unit 21 by the locking mechanism including the lock arm 81 and the engagement recessed portion 83.

FIG. 8 is an exploded perspective view showing the rescue terminal portion 29 and the general-purpose connector mounting unit 21. As shown in FIG. 8, the connector of the electrical junction box 11 may be the rescue terminal portion 29. The rescue terminal portion 29 is detachably mounted on the connector mounting portion 35 of the general-purpose connector mounting unit 21. The rescue terminal portion 29 is formed in a rectangular parallelepiped shape in a plan view. The rescue terminal 107 of the rescue terminal portion 29 is covered with a resin cover 99 so as to be exposed. The resin cover 99 is rotatably attached to the rescue terminal portion 29 by a rotation hinge structure. The resin cover 99 covers the rescue terminal 107 of the rescue terminal portion 29 at a closed position shown in FIG. 8.

Figure 9:
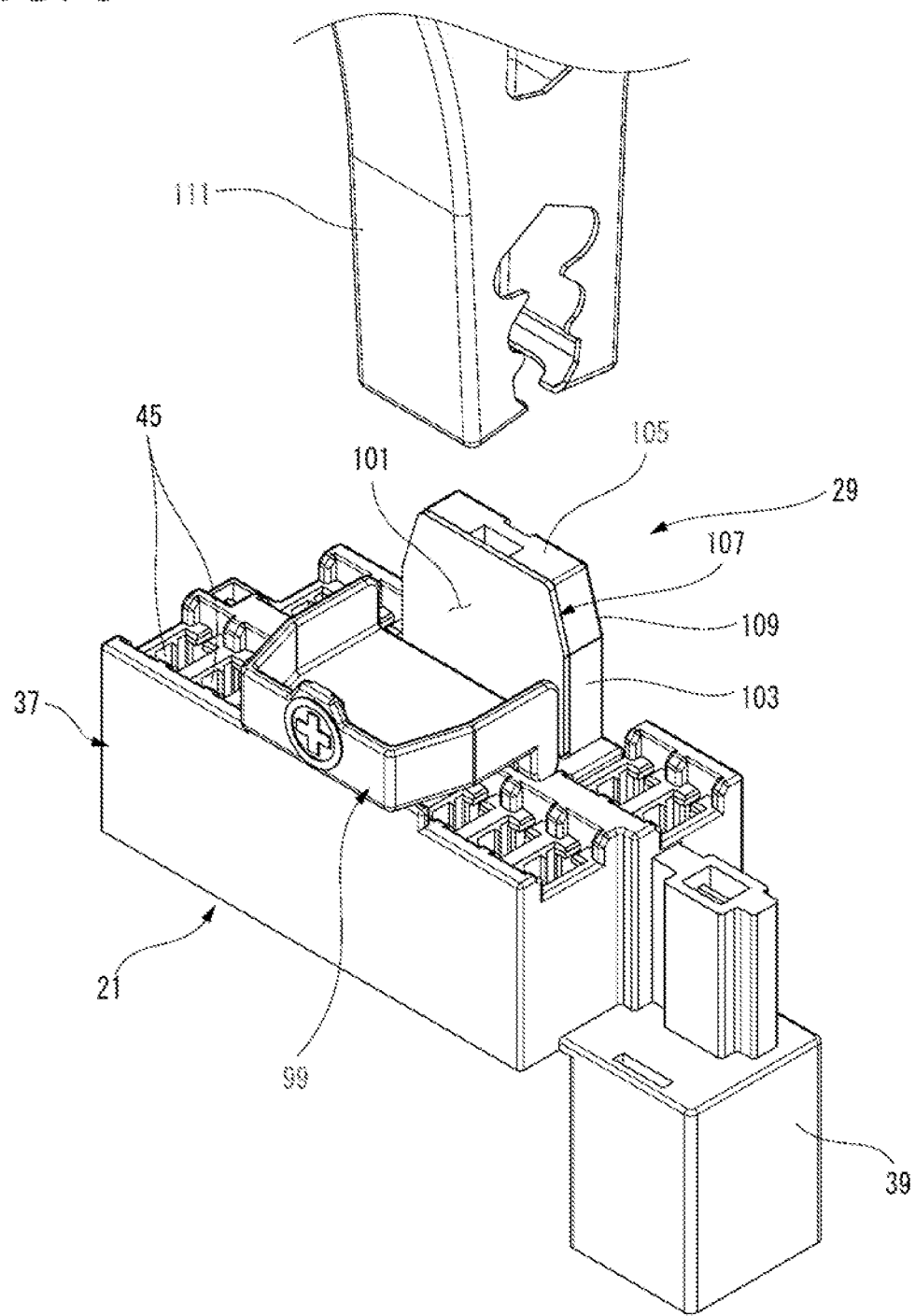
FIG. 9 is a perspective view of the rescue terminal portion exposed when a resin cover is rotated to an open position by a rotation hinge structure.

FIG. 9 is a perspective view of the rescue terminal portion 29 exposed when the resin cover 99 is rotated to an open position by the rotation hinge structure. The resin cover 99 covers one longitudinal side face 101, two lateral side faces 103 adjacent to the longitudinal side face 101, and an upper face 105 of the rescue terminal portion 29.

As shown in FIG. 9, the rescue terminal portion 29 exposed at the open position of the resin cover 99 is provided with the plate-shaped rescue terminal 107, which is a power supply side terminal of the rescue terminal portion 29, on the longitudinal side face 101. The rescue terminal 107 is supported by a terminal support plate 109 made of an insulating resin that stands perpendicularly to the general-purpose connector mounting unit 21. That is, in the rescue terminal portion 29, the rescue terminal 107 and the terminal support plate 109 are stacked in a plate thickness direction, and the rescue terminal 107 is exposed on one face side of the terminal support plate 109. The rescue terminal portion 29 is sandwiched from the plate thickness direction by a clamp portion 111 (opening) made of a conductive metal which is closed by a spring force, and the rescue terminal 107 is electrically connected to a booster cable (not shown).

Figure 10:
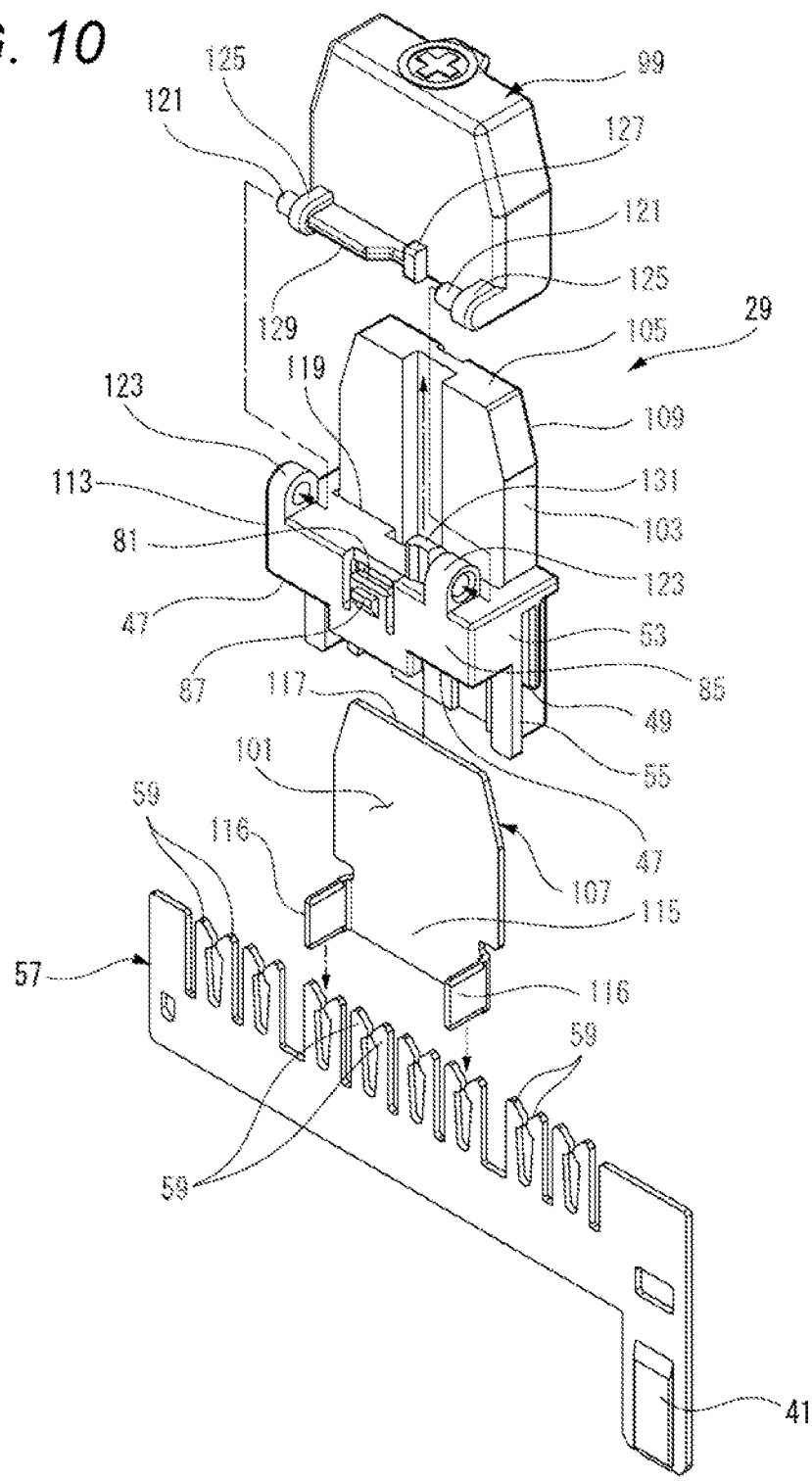
FIG. 10 is an exploded perspective view showing the rescue terminal portion and the tuning fork terminal.

FIG. 10 is an exploded perspective view showing the rescue terminal portion 29 and the tuning fork terminal 57. An insertion portion 113 formed in the terminal support plate 109 of the rescue terminal portion 29 is detachably mounted on the connector mounting portion 35 of the general-purpose connector mounting unit 21. As shown in FIG. 10, the rescue terminal portion 29 has an electric contact piece 116 which is a pair of parallel tab terminals vertically bent from the rescue terminal 107 at a terminal base end portion 115 of the rescue terminal 107. In the rescue terminal 107, the terminal tip end portion 117 excluding the terminal base end portion 115 is inserted into a slit hole 119 formed in the terminal support plate 109 and held by the terminal support plate 109.

In the rescue terminal portion 29 in which the rescue terminal 107 and the terminal support plate 109 are integrated, when the insertion portion 113 is mounted on the connector mounting portion 35, the pair of electric contact pieces 116 are conductively connected to the tuning fork terminal 57 disposed in the general-purpose connector mounting unit 21. A pair of holding pieces 59 of the tuning fork terminal 57 sandwich the electric contact pieces 116 of the rescue terminal 107 from the plate thickness direction.

Similarly to the other connectors described above, the detachment of the rescue terminal portion 29, whose insertion portion 113 is mounted on the connector mounting portion 35 of the general-purpose connector mounting unit 21, from the connector mounting portion 35 is restricted by the lock arm 81 formed with the lock claw 87.

The resin cover 99 includes a pair of coaxial rotary shafts 121 extending along the longitudinal direction on a base end portion side of the longitudinal side face 101. The resin cover 99 is rotatable with respect to the rescue terminal portion 29 about the rotary shafts 121.

The terminal support plate 109 of the rescue terminal portion 29 includes a pair of bearing portions 123 on an upper face of the insertion portion 113 in which the slit hole 119 through which the terminal tip end portion 117 protrudes is opened. The pair of bearing portions 123 are disposed so as to be spaced apart from each other at positions at which the pair of rotary shafts 121 are supported. The pair of rotary shafts 121 provided in the resin cover 99 are both provided in the resin cover 99 by a shaft support portion 125 formed on the same end side (right end side in FIG. 10). The pair of rotary shafts 121 are inserted by sliding shaft tip end portions on a side opposite to the shaft support portions 125 from the same direction of the pair of bearing portions 123 at the same time. In the resin cover 99 in which the rotary shafts 121 are inserted into the bearing portions 123 by sliding, the shaft support portions 125 come into contact with the bearing portions 123, and further sliding is restricted.

As shown in FIG. 9, when the rescue terminal portion 29 is mounted on the general-purpose connector mounting unit 21, the resin cover 99 is rotated from the closed position (position shown in FIG. 8) to an open position (position shown in FIG. 9), which is substantially 90 degrees. Further, after the rescue terminal portion 29 is detached from the general-purpose connector mounting unit 21, the resin cover 99 can further rotate by substantially 90 degrees to a position at which the resin cover 99 comes into contact with a side face of the insertion portion 113 (fully open position). That is, a rotation angle range of the resin cover 99 is substantially 180 degrees from the closed position to the fully open position in a state in which the rescue terminal portion 29 is detached from the general-purpose connector mounting unit 21.

A slide restriction protrusion 127 is formed between the shaft support portion 125 on one side (the left side in FIG. 10) and the shaft support portion 125 on the other side (the right side in FIG. 10) of the resin cover 99. In the resin cover 99, a reinforcing plate portion 129 is formed between the shaft support portion 125 on the one side (left side in FIG. 9) and the slide restriction protrusion 127. On the other hand, in the terminal support plate 109 of the rescue terminal portion 29, a stopper protrusion 131 that comes into contact with the slide restriction protrusion 127 to restrict the sliding of the resin cover 99 toward the right direction in FIG. 10 is formed on the upper face of the insertion portion 113.

In the closed position shown in FIG. 8, the slide restriction protrusion 127 of the resin cover 99 comes into contact with the stopper protrusion 131 and the sliding is restricted. Further, in the resin cover 99, even at the open position rotated by 90 degrees shown in FIG. 9, the slide restriction protrusion 127 comes into contact with the stopper protrusion 131 and the sliding is restricted. That is, in a state in which the rescue terminal portion 29 is mounted on the general-purpose connector mounting unit 21, the resin cover 99 comes into contact with the general-purpose connector mounting unit 21 and is rotated only to the open position by 90 degrees, and therefore, the sliding of the resin cover 99 remains restricted. That is, unless the rescue terminal portion 29 is detached from the general-purpose connector mounting unit 21, the resin cover 99 is not detached from the rescue terminal portion 29.

Here, the rotation hinge structure for rotatably holding the resin cover 99 allows the resin cover 99 to be attached to and detached from the rescue terminal portion 29 only at the fully open position (the position rotated by 180 degrees). That is, the resin cover 99 is moved to a position where the slide restriction protrusion 127 does not interfere with the stopper protrusion 131 at a position rotated by 180 degrees from the closed position.

Since the slide restriction protrusion 127 does not interfere with the stopper protrusion 131 at the fully open position, the resin cover 99 can slide in a direction in which the rotary shafts 121 are pulled out from the bearing portions 123. The resin cover 99 in which the rotary shafts 121 are removed from the bearing portions 123 can be removed from the rescue terminal portion 29. It should be noted that the attachment of the resin cover 99 to the rescue terminal portion 29 can be performed in a procedure reverse to the procedure in which the resin cover 99 is removed from the fully open position.

Similarly to other connectors, the rescue terminal portion 29 has the upper step portion 47, the lower step portion 49, and the engagement rib 55, which are engaged with the connector mounting portion 35, in the insertion portion 113 of the terminal support plate 109. Similarly to other connectors, the rescue terminal portion 29 includes the lock arm 81 on which the lock claw 87 is formed at the insertion portion 113.

Next, functions of the above configuration will be described. In the electrical junction box 11 according to the present embodiment, the case body 13 includes a plurality of connector portions. The connector portions are, for example, the mounting portions 17 to which electrical components such as a relay, a fuse, a fusible link, or a harness connecting socket is mounted. The case body 13 includes a busbar 10 which is a power supply side circuit board provided integrally with the case body 13.

Each of the mounting portions 17 is provided with a case terminal portion (not shown) formed by bending or cutting a plate-shaped busbar. The case terminal portion disposed in each of the mounting portions 17 is electrically connected to a power supply side terminal such as a relay, a fuse, a fusible link, or a harness connection socket mounted on the mounting portion 17.

The general-purpose connector mounting unit 21 is provided in a portion of the case body 13 (that is, one of the plurality of mounting portions 17). A plurality of types of connectors are selectively attachable to and detachable from the general-purpose connector mounting unit 21. Here, the connector is the fuse portion 27, the fusible link unit 25, or the rescue terminal portion 29 in the present embodiment.

In the general-purpose connector mounting unit 21, the power supply side connection terminal 61, the power supply side terminal 23, or the rescue terminal 107 which are power supply side terminals of a plurality of types of connectors, can be electrically connected to the tuning fork terminal 57 electrically connected to the busbar 10.

In the electrical junction box 11 of the present configuration, the general-purpose connector mounting unit 21 is provided in a portion of the plurality of mounting portions 17 provided in the case body 13, and the general-purpose connector mounting unit 21 allows different types of connectors (that is, the fuse portion 27, the fusible link unit 25, or the rescue terminal portion 29) to be selectively attached and detached. The general-purpose connector mounting unit 21 may be provided integrally with the case body 13.

The general-purpose connector mounting unit 21 includes a connector mounting portion 35 on which the fuse portion 27, the fusible link unit 25, or the rescue terminal portion 29 can be mounted. On the other hand, the fuse portion 27, the fusible link unit 25, and the rescue terminal portion 29 include the upper step portion 47, the lower step portion 49, and the engagement rib 55 to be engaged with the connector mounting portion 35.

As a result, in the electrical junction box 11 according to the present embodiment, the general-purpose connector mounting unit 21 is interposed between the mounting portion 17 of the case body 13 and the different types of connectors, so that the general-purpose connector mounting unit 21 functions as an adapter for selectively connecting different types of connectors.

That is, in the electrical junction box 11 of the present configuration, the general-purpose connector mounting unit 21 is mounted on the mounting portion 17 of the case body 13, so that different types of connectors (that is, the fuse portion 27, the fusible link unit 25, or the rescue terminal portion 29), which are difficult to be replaced in the mounting portion 17 in the related-art structure, can be selectively attached and detached. As a result, in the electrical junction box, the circuit can be easily changed. In addition, since different types of connectors (for example, a harness connection socket not shown) can be selectively attached and detached, the assembling property of the wire harness can be improved.

In the electrical junction box 11 according to the present embodiment, the terminal connection portion provided in the general-purpose connector mounting unit 21, which is a part of the busbar 10, serves as the tuning fork terminal 57. Further, the general-purpose connector mounting unit 21 is provided with the deformation prevention protection structure for preventing deformation of the tuning fork terminal 57 due to external force.

In the electrical junction box 11, as described above, the general-purpose connector mounting unit 21 can selectively connect different types of connectors (the fuse portion 27, the fusible link unit 25, or the rescue terminal portion 29). The power supply side terminal 23, the power supply side connection terminal 61, or the rescue terminal 107, which is the power supply side terminal, is electrically connected to the tuning fork terminal 57, so that each of the connectors is electrically connected to the busbar of the electrical junction box 11 via the tuning fork terminal 57. At this time, in the tuning fork terminal 57, for example, the electric contact piece 65 of the power supply side connection terminal 61 in the fusible link unit 25 is not inserted into the predetermined terminal gap of the tuning fork terminal 57, and the deformation caused by an external force in a direction other than a predetermined direction applied by the power supply side connection terminal 61 is prevented by the deformation prevention protection structure.

That is, when the electric contact piece 65 of the power supply side connection terminal 61 is inserted into the slit 71, an external force in a direction other than the predetermined direction is less likely to act on the tuning fork terminal 57. In addition, by being surrounded by the deformation prevention protection structure, the tuning fork terminal 57 is also prevented from being deformed by, for example, an external force caused by contact with the fuse socket 91 or the fusible link socket 33 required by the fuse 43 or the fusible link 31.

In the electrical junction box 11 according to the present embodiment, the upper step portion 47, the lower step portion 49, and the engagement rib 55 provided in the respective connectors (the fuse portion 27, the fusible link unit 25, or the rescue terminal portion 29) are engaged to and mounted on the opening upper end surface 73, the placing rib 77, and the engagement groove 79 of the general-purpose connector mounting unit 21 provided in the case body 13. The general-purpose connector mounting unit 21 and the connector (the fuse portion 27, the fusible link unit 25, or the rescue terminal portion 29) in which the opening upper end surface 73, the placing rib 77, and the engagement groove 79 are engaged with the upper step portion 47, the lower step portion 49, and the engagement rib 55 are locked and fixed by the locking mechanism. Thus, the connector (the fuse portion 27, the fusible link unit 25, or the rescue terminal portion 29) is restricted from being detached from the general-purpose connector mounting unit 21, that is, from the electrical junction box 11.

The locking mechanism can be configured with, for example, the lock arm 81 provided in a connector (the fuse portion 27, the fusible link unit 25, or the rescue terminal portion 29) and the engagement recessed portion 83 provided in the general-purpose connector mounting unit 21. The lock arm 81 provided in each connector is set such that the position of the lock arm 81 relative to the upper step portion 47, the lower step portion 49, and the engagement rib 55 is aligned with the engagement recessed portion 83 in any one of the connector when the connector is mounted on the general-purpose connector mounting unit 21.

That is, even if external shapes of the fuse portion 27, the fusible link unit 25, and the rescue terminal portion 29, which are the connectors, are different from each other, the upper step portion 47, the lower step portion 49, and the engagement rib 55 thereof can be engaged with the opening upper end surface 73, the placing rib 77, and the engagement groove 79 of the general-purpose connector mounting unit 21, respectively.

As a result, according to the electrical junction box 11 of the present embodiment, any of the different types of connectors (the fuse portion 27, the fusible link unit 25, or the rescue terminal portion 29) selectively connected can be equally locked and fixed to the general-purpose connector mounting unit 21 (that is, the electrical connection box 11).

Therefore, according to the electrical junction box 11 of the present embodiment, it is possible to easily change the circuit by making it possible to replace different connectors (the fuse portion 27, the fusible link unit 25, or the rescue terminal portion 29).

According to an aspect of the embodiments described above, an electrical junction box (11) includes a case body (13) having a plurality of connector portions (for example, mounting portions 17), a power supply side circuit board (for example, busbar 10) accommodated in the case body (13) and a general-purpose connector mounting unit (21) provided in the case body (13) and configured such that a plurality of types of connectors (for example, the fuse portion 27, the fusible link unit 25, or the rescue terminal portion 29) are selectively attached to and detached from the general-purpose connector mounting unit (21). The general-purpose connector mounting unit (21) is configured such that a power supply side terminal (for example, the power supply side terminal 23, the power supply side connection terminal 61, or the rescue terminal 107) of the plurality of types of connectors (the fuse portion 27, the fusible link unit 25, or the rescue terminal portion 29) is electrically connected to a terminal connection portion (for example, the tuning fork terminal 57) of the power supply side circuit board (busbar 10).

According to the electrical junction box (11) having the configuration as described above, the case body (13) includes the plurality of connector portions (mounting portions 17). The connector portions are, for example, the mounting portions to which electrical components such as a relay, a fuse, a fusible link, or a harness connecting socket is mounted. The general-purpose connector mounting unit (21) is provided in a portion of the case body (13) (that is, one of the plurality of connector portions). The plurality of types of connectors (the fuse portion 27, the fusible link unit 25, or the rescue terminal portion 29) are selectively attachable to and detachable from the general-purpose connector mounting unit (21). In the general-purpose connector mounting unit (21), the power supply side terminals (the power supply side terminal 23, the power supply side connection terminal 61, or the rescue terminal 107) of the plurality of types of connectors can be electrically connected to a part of the terminal connection portion (the tuning fork terminal 57) electrically connected to the power supply side circuit board (the busbar 10). In the electrical junction box (11) of the present configuration, the general-purpose connector mounting unit (21) is interposed between the case body (13) and the different types of connectors, so that the general-purpose connector mounting unit (21) functions as an adapter for selectively connecting different types of connectors. That is, in the electrical junction box (11) of the present configuration, the case body (13) includes the general-purpose connector mounting unit (21), so that different types of connectors (that is, the fuse portion 27, the fusible link unit 25, the rescue terminal portion 29 and the like), which are difficult to be replaced in a mounting portion in the related-art structure, can be selectively attached and detached. As a result, according to the electrical junction box (11) of the present configuration, the circuit can be easily changed.

The terminal connection portion may be a tuning fork terminal (57). A deformation prevention protection structure configured to prevent deformation of the tuning fork terminal (57) due to an external force may be provided in the general-purpose connector mounting unit (21).

With this configuration, the terminal connection portion provided in the general-purpose connector mounting unit (21), which is a part of the power supply side circuit board (busbar 10), serves as the tuning fork terminal (57). Further, the general-purpose connector mounting unit (21) is provided with the deformation prevention protection structure for preventing deformation of the tuning fork terminal (57) due to external force. The power supply side terminal (the power supply side terminal 23, the power supply side connection terminal 61, or the rescue terminal 107) is electrically connected to the tuning fork terminal (57), so that each of the connectors (the fuse portion 27, the fusible link unit 25, or the rescue terminal portion 29) is electrically connected to the power supply side circuit board (the busbar 10) of the electrical junction box (11) via the tuning fork terminal (57). At this time, in the tuning fork terminal (57), for example, the power supply side terminal of the connector is not inserted into the predetermined terminal gap of the tuning fork terminal (57), and deformation caused by an external force in a direction other than a predetermined direction applied by the power supply side terminal is prevented by the deformation prevention protection structure.

The plurality of types of connectors (the fuse portion 27, the fusible link unit 25, or the rescue terminal portion 29) may be configured to be locked and fixed to the general-purpose connector mounting unit (21) via a locking mechanism (for example, the lock arm 81 and the engagement recessed portion 83) configured to be releasable from above the case body (13).

With this configuration, each of the connectors is selectively mounted on the general-purpose connector mounting unit (21) provided in the case body (13). The connector (the fuse portion 27, the fusible link unit 25, or the rescue terminal portion 29) is locked and fixed to the general-purpose connector mounting unit by the locking mechanism (the lock arm 81 and the engagement recessed portion 83). Accordingly, the connector is restricted from being detached from the general-purpose connector mounting unit (21), that is, from the electrical junction box (11). As a result, according to the electrical junction box (11) of the configuration, any of the types of connectors selectively connected can be equally locked and fixed to the general-purpose connector mounting unit (21) of the case body (13).

While the presently disclosed subject matter has been described with reference to certain exemplary embodiments thereof, the scope of the presently disclosed subject matter is not limited to the exemplary embodiments described above, and it will be understood by those skilled in the art that various changes and modifications may be made therein without departing from the scope of the presently disclosed subject matter as defined by the appended claims.

What is claimed is:

1. An electrical junction box comprising:
a case body having a plurality of connector portions;
a power supply side circuit board accommodated in the case body; and
a general-purpose connector mounting unit provided in the case body and configured such that a plurality of types of connectors are selectively attached to and detached from the general-purpose connector mounting unit,
wherein the general-purpose connector mounting unit is configured to accommodate a plurality of different shapes of the plurality of different types of connectors,
wherein the general-purpose connector mounting unit is configured such that a power supply side terminal of the plurality of types of connectors is electrically connected to a terminal connection portion of the power supply side circuit board, and
wherein the terminal connection portion of the power supply side circuit board has a shape electrically connected to any of the plurality of different shapes of the plurality of different types of connectors.

2. The electrical junction box according to claim 1,
wherein the terminal connection portion is a tuning fork terminal, and
wherein a deformation prevention protection structure configured to prevent deformation of the tuning fork terminal due to an external force is provided in the general-purpose connector mounting unit.

3. The electrical junction box according to claim 1,
wherein the plurality of types of connectors are configured to be locked and fixed to the general-purpose connector mounting unit via a locking mechanism configured to be releasable from above the case body.

* * * * *